United States Patent [19]

Sato et al.

[11] Patent Number: 4,632,960

[45] Date of Patent: Dec. 30, 1986

[54] RESIN COMPOSITION COMPRISING A THERMOSETTING RESIN COMPONENT AND A FUNCTIONAL, RUBBERY COPOLYMER COMPONENT

[75] Inventors: Hozumi Sato; Tatsuaki Matsunaga; Shin-ichiro Iwanaga, all of Yokkaichi; Hiroji Enyo, Suzuka; Yoshiaki Kawamura; Yasuhiko Takemura, both of Yokkaichi, all of Japan

[73] Assignee: Japan Synthetic Rubber Co., Ltd., Tokyo, Japan

[21] Appl. No.: 766,347

[22] Filed: Aug. 16, 1985

[30] Foreign Application Priority Data

Aug. 17, 1984 [JP] Japan ................................ 59-170390
Sep. 12, 1984 [JP] Japan ................................ 59-189733

[51] Int. Cl.$^4$ .......................................... C08L 63/00
[52] U.S. Cl. .................................... 525/117; 525/118; 525/119; 525/122; 525/139; 525/142; 525/143; 525/161; 525/162; 525/163; 525/164
[58] Field of Search ............... 525/117, 118, 119, 139, 525/142, 143, 161, 162, 163, 122, 164

[56] References Cited

U.S. PATENT DOCUMENTS 3,444,121  5/1969  Altier et al. .................... 525/119 X

FOREIGN PATENT DOCUMENTS 50-119087  3/1974  Japan .
1407851  11/1972  United Kingdom .

Primary Examiner—Theodore E. Pertilla
Attorney, Agent, or Firm—Oblon, Fisher, Spivak, McClelland, & Maier

[57] ABSTRACT

A resin composition comprising 100 parts by weight of a thermosetting resin and 1 to 100 parts by weight of a functional, rubbery copolymer containing among the monomer units which constitute the copolymer, at least one monomer containing a substituent selected from the group consisting of epoxy, hydroxyl, carboxyl and amino groups, said copolymer being prepared by one of three emulsion polymerization processes in which a nonionic surface active agent and/or ionic surface active agent is employed as the emulsifying agent.

20 Claims, No Drawings

RESIN COMPOSITION COMPRISING A THERMOSETTING RESIN COMPONENT AND A FUNCTIONAL, RUBBERY COPOLYMER COMPONENT

BACKGROUND OF THE INVENTION

1. Field of the Invention

This invention relates to a thermosetting resin composition having a very low metal-corrosiveness, an excellent strength, an excellent impact resistance and a small molding shrinkage.

2. Description of Prior Art

In recent years, thermosetting resins have been used in a remarkably increased amount in the field of coating material for electronic parts because of their excellency in adhesion, insulation, moisture resistance and heat resistance. However, thermosetting resins are brittle, although they are high-strength materials. Also, when used as a coating material for electronic parts, they shrink during setting, and hence, stress is applied to the semiconductor elements coated by them. If the stress is large, the elements becomes fractured in some cases.

In order to solve the above problem, it has been tried to use a thermosetting resin composition obtained by blending a thermosetting resin with a rubber or a modified rubber or a rubber-modified thermosetting resin obtained by preliminarily reacting a thermosetting resin with a rubber.

However, when a thermosetting resin composition obtained by blending a thermosetting resin with a conventional rubber material is used for coating a semiconductor, metal ions and other impurities resulting from the emulsifier contained in the rubber material and from the use of a coagulant cause corrosion of lead wires (aluminum wires in many cases) of the semiconductor.

SUMMARY OF THE INVENTION

Under such circumstances, the present inventors have made extensive research on a thermosetting resin composition having a low metal-corrosiveness, an excellent strength and impact resistance and a small molding shrinkage. As a result, it has been found that a thermosetting resin composition consisting of (a) a functional, rubbery copolymer obtained by a special production process having a low metal-corrosiveness and (b) a thermosetting resin can solve the above-mentioned corrosion problem.

According to this invention, there is provided a resin composition comprising 100 parts by weight of a thermosetting resin and 1 to 100 parts by weight of a functional, rubbery copolymer containing as one of the monomer units constituting the copolymer at least one monomer having a group selected from the group consisting of epoxy, hydroxyl, carboxyl and amino groups, said copolymer being produced by one of the following methods:

(a) a method comprising subjecting the constituent monomers to emulsion polymerization using an emulsifier consisting of 1 to 15 parts by weight of a nonionic surface active agent and 0 to 10 parts by weight of an ionic surface active agent per 100 parts by weight of the monomers, the weight ratio of the ionic surface active agent to the nonionic surface active agent being 0–2.0:1, recovering unreacted monomers, adding a metal-free electrolyte to the resulting polymer emulsion, heating the resulting mixture to precipitate a polymer, optionally washing the polymer with water, and then drying the polymer, (b) a method comprising subjecting the constituent monomers to emulsion polymerization using an ionic surface active agent as an emulsifier, recovering unreacted monomers, adding a metal-free electrolyte and a nonionic surface active agent to the resulting polymer emulsion, heating the resulting mixture to precipitate a polymer, optionally washing the polymer with water, and then drying the polymer, and (c) a method comprising subjecting the constituent monomers to emulsion polymerization using a nonionic surface active agent as an emulsifier at a temperature lower than the cloud point of the nonionic surface active agent and then heating the resulting polymer latex to a temperature not lower than said cloud point to coagulate the latex without using any coagulant.

Synthesis of almost all rubbery copolymers, particularly rubbery copolymers containing a diene component, is usually conducted in accordance with an emulsion polymerization process.

In conventional emulsion polymerization processes, however, anionic surface active agents which contain, as the counter ion, an alkali metal such as potassium, sodium or the like are in general widely used as emulsifiers. Also, in the step of separating the polymer latex formed, a metal compound such as sodium chloride, potassium chloride or the like is used as the coagulant. These metal ions remain in the polymer formed and cannot be sufficiently removed even by coagulating the polymer latex and washing the same with water. Consequently, thermosetting resin compositions obtained by mixing a rubbery copolymer produced in accordance with a conventional emulsion polymerization process with a thermosetting resin have high metal-corrosiveness and hence cannot be used in electronic parts of high reliability such as IC and LSI.

Furthermore, in synthesis of rubbery copolymers according to a solution polymerization process, the amount of metal ions in rubber can be reduced; however, only a polymer having a low molecular weight is generally produced. Moreover, the production cost of polymer is high.

On the other hand, the functional rubbery copolymer used in this invention is produced by one of the following methods:

(a) a method comprising subjecting the constituent monomers to emulsion polymerization using an emulsifier consisting of 1 to 15 parts by weight of a nonionic surface active agent and 0 to 10 parts by weight of an ionic surface active agent per 100 parts by weight of the monomers, the weight ratio of the ionic surface active agent to the nonionic surface active agent being 0–2.0:1, recovering unreacted monomers, adding a metal-free electrolyte to the resulting polymer emulsion, heating the resulting mixture to precipitate a polymer, optionally washing the polymer with water, and then drying the polymer, (b) a method comprising subjecting the constituent monomers to emulsion polymerization using an ionic surface active agent as an emulsifier, recovering unreacted monomers, adding a metal-free electrolyte and a nonionic surface active agent to the resulting polymer emulsion, heating the resulting mixture to precipitate a polymer, optionally washing the polymer with water, and then drying the polymer, and (c) a method comprising subjecting the constituent monomers to emulsion polymerization using a nonionic surface active agent as an emulsifier at a temperature lower than the cloud point of the nonionic surface active agent and then heating the resulting polymer latex to a temperature not lower than said cloud point to coagulate the latex without using any coagulant.

When a thermosetting resin is blended with one of the following rubbery copolymers (I), (II) and (III) produced by the above polymerization methods, there is obtained a thermosetting resin composition having an excellent impact resistance, a small molding shrinkage and a low metal-corrosiveness:

(I) A rubbery copolymer comprising 1 to 20% by weight of at least one monomer having a group selected from the group consisting of epoxy, hydroxyl, carboxyl and amino group, 15 to 50% by weight of acrylonitrile and 40 to 80% by weight of butadiene and/or isoprene as the monomer units constituting the copolymer. When the acrylonitrile content is less than 15% by weight, this copolymer is insufficient in oil resistance, and when the acrylonitrile content exceeds 50% by weight, the copolymer has a reduced elasticity. The acrylonitrile content is preferably 25 to 45% by weight. When the butadiene and/or isoprene content is less than 40% by weight, the copolymer is insufficient in rubber elasticity, and when it exceeds 80% by weight, the copolymer has a poor compatibility with the thermosetting resins.

(II) A rubbery copolymer comprising as the monomer units constituting the copolymer 1 to 20% by weight of at least one monomer having a group selected from the group consisting of epoxy, hydroxyl, carboxyl and amino groups, 40 to 99% by weight of an alkyl(meth)acrylate and/or an alkoxyalkyl(meth)acrylate and 0 to 30% by weight of other monomers copolymerizable with these monomers (specifically, ethylidenenorbornene, dicyclopentadienyl acrylate, acrylonitrile, styrene or the like is added depending upon purposes). When the alkyl (meth)acrylate and/or alkoxyalkyl(meth)acrylate content is less than 40% by weight, this copolymer is insufficient in oil resistance and compatibility with the thermosetting resin.

(III) A rubbery copolymer comprising as the monomer units constituting the copolymer 1 to 20% by weight of at least one monomer having a group selected from the group consisting of epoxy, hydroxyl, carboxyl and amino groups, 15 to 50% by weight of acrylonitrile, 20 to 60% by weight of butadiene and/or isoprene and 5 to 65% by weight of an alkyl(meth)acrylate and/or an alkoxyalkyl(meth)acrylate. When the acrylonitrile content is less than 15% by weight, this copolymer is insufficient in oil resistance, and when it exceeds 50% by weight, the copolymer has a reduced elasticity. The acrylonitrile content is preferably 25 to 45% by weight. When the alkyl(meth)acrylate and/or alkoxyalkyl(meth)acrylate is less than 5% by weight, the copolymer is poor in weather resistance, and when it exceeds 65% by weight, the copolymer is poor in rubber elasticity. When the butadiene and/or isoprene content is less than 20% by weight, the copolymer is poor in rubber elasticity, and when it exceeds 60% by weight, the copolymer is poor in weather resistance.

In this invention, the monomer having a carboxyl group includes specifically acrylic acid, methacrylic acid, maleic acid and fumaric acid, and these may be used alone or in admixture of two or more.

The monomer having an epoxy group includes specifically glycidyl(meth)acrylate, allyl glycidyl ether and vinyl glycidyl ether, and these may be used alone or in admixture of two or more.

The monomer having a hydroxyl group includes specifically 1-hydroxypropyl(meth)acrylate, 2-hydroxypropyl(meth)acrylate, hydroxyethyl(meth)acrylate, and the like, and these may be used alone or in admixture of two or more.

The monomer having an amino group includes specifically monomers having a tertiary amino group such as dimethylaminoethyl(meth)acrylate, diethylaminoethyl(meth)acrylate, dibutylaminoethyl(meth)acrylate and the like, and these may be used alone or in admixture of two or more.

The alkyl(meth)acrylate includes specifically ethyl acrylate, ethyl methacrylate, propyl acrylate, butyl actylate, butyl methacrylate, hexyl acrylate, 2-ethylhexyl acrylate, octyl acrylate, and the like, and these may be used alone or in admixture of two or more.

The alkoxyalkyl(meth)acrylate includes specifically ethoxyethyl acrylate, methoxyethyl acrylate, propoxyethyl acrylate, methoxyethyl methacrylate, ethoxyethyl methacrylate, butoxyethyl acrylate, butoxyethyl methacrylate, and the like, and these may be used alone or in admixture of two or more.

Alkyl(meth)acrylates and alkoxyalkyl(meth)acrylates having incorporated thereinto a functional group other than carboxyl, epoxy, hydroxyl and amino groups can also be used. Specific examples of these compounds are cyanoethyl(meth)acrylate, mercaptopropyl(meth)acrylate and 2-chloroethoxyethyl(meth)acrylate.

The nonionic surface active agents used as an emulsifier in the production of the functional, rubbery copolymer used in the resin composition of this invention are those having a remarkable surface activity at a low concentration but not ionizing in an aqueous solution. Specific examples of the nonionic surface active agent include polyoxyethylene alkyl ethers, polyoxyethylene alkylaryl ethers, polyoxyethylene fatty acid esters, polyoxyethylene sorbitan fatty acid esters, polyoxyethylene oxypropylene block polymers, alkyl sulfinyl alcohols and fatty acid monoglycerides, and the like.

These nonionic surface active agents can be used alone or in combination of two or more and are appropriately selected depending upon polymerization conditions and use purposes. The amount of the nonionic surface active agent used is 1 to 15 parts by weight per 100 parts by weight of the monomers. The nonionic surface active agent used has preferably a cloud point of 20° to 110° C. When the cloud point is too low, the latex formed has an insufficient stability, and when the cloud point is too high, a high temperature is required for coagulation of latex; therefore, too low or too high a cloud point is not practical.

In this invention, the ionic surface active agent is used together with the nonionic surface active agent to ensure the stability of latex during the recovery of unreacted monomers. The ionic surface active agent is, in this case, used in an amount of 0 to 10 parts by weight, preferably 0.1 to 10 parts by weight, per 100 parts by weight of the monomers. When the amount exceeds 10 parts by weight, coagulation of latex is insufficient and such a large amount is not practical. In view of latex stability, an amount of 0.1 part by weight or more is preferred.

The weight ratio of the ionic surface active agent to the nonionic surface active agent must be 2.0 or less.

When the weight ratio exceeds 2.0, an extremely high temperature is required during coagulation, or addition of a large amount of an electrolyte is required. Therefore, it is impractical.

The ionic surface active agent may be any of anionic surface active agents (e.g. sulfuric acid esters of higher alcohols, salts of alkylbenzenesulfonic acids, salts of aliphatic sulfonic acids), cationic surface active agents (e.g. dodecyltrimethylammonium chloride and the like) and amphoteric surface active agents containing a carboxylic acid salt, a sulfuric acid ester salt, a sulfonic acid salt or a phosphoric acid ester salt as the anionic portion and an amine salt or a quaternary ammonium salt as a cationic portion. These surface active agents can be appropriately selected depending upon use purposes.

When the nonionic surface active agent is used alone, a latex can be coagulated by heating it to a temperature not lower than the cloud point of the nonionic surface active agent. However, when the ionic surface active agent is used together with the nonionic surface active agent, the latex cannot be coagulated by only heating unlike the use of the anionic surface acture agent alone, and therefore, the latex is coagulated by adding an electrolyte thereto, stirring the resulting mixture and heating it, and the polymer separated is then taken out. In this process, the heating is the point and the mere addition of an electrolyte causes no coagulation. The amount of the electrolyte used may be varied depending upon the type of polymer and the type and amount of the surface active agent used in polymerization, though an amount of 5 to 20 parts by weight per 100 parts by weight of the polymer in a latex is sufficient.

As the electrolyte, preferred are amonium salts such as ammonium sulfate, ammonium chloride, ammonium nitrate, ammonium phosphate, ammonium acetate and the like, for the purpose of incorporating no metal ion.

As mentioned above, emulsion polymerization is conducted using the ionic surface active agent alone or in combination with the nonionic surface active agent to obtain a polymer emulsion, and the polymer emulsion is subjected to monomer recovery in a conventional manner, after which the electrolyte is added to the emulsion (the electrolyte and the nonionic surface active agent are added when polymerization is conducted using the ionic surface active agent alone), and the emulsion is then heated to precipitate a polymer which is then taken out.

When an aqueous solution containing the nonionic surface active agent mentioned above is heated, the solution begins to cloud at a certain temperature. This temperature is called cloud point. This is the phenomenon characteristic of aqueous solutions containing a nonionic surface active agent. The cloud point corresponds thermodynamically to a lower critical temperature (LCST). When an aqueous solution containing a nonionic surface active agent is heated, white turbidity, namely, a phase separation phenomenon appears at a temperature not lower than the cloud point of the nonionic surface active agent and a system having a single uniform phase is converted into a system having two phases, namely aqueous phase and surface active agent phase.

It can be said that this means that the concentration of the nonionic surface active agent in the aqueous phase has been reduced, and in other words, the surface active agent has become difficult to dissolve in water.

Thus, nonionic active agents are sparingly soluble in water at temperatures not lower than their cloud points and lose their activities as surfactants. This corresponds to a latex separation step wherein an acid or a polyvalent metal ion is added to an anionic surface active agent to reduce the water-solubility of the anionic surface active agent and to coagulate a polymer latex. That is, when a nonionic surface active agent is used as an emulsifier in emulsion polymerization, it is possible to coagulate the latex by utilizing the cloud point phenomenon of the nonionic surface active agent without using any coagulant.

Thus, the use of a nonionic surface active agent enables the copolymer used in this invention to be completely free of any metal ion from emusifiers and coagulants.

The emulsion polymerization used in this invention will be explained specifically.

The polymerization may be carried out in accordance with a conventional emulsion polymerization using a polymerization initiator such as a peroxide, a redox type compound, an azo type compound, a persulfate or the like. If necessary, a molecular weight regulator or other additives may be used. Any emulsion-polymerizable monomers can be used, and there is no restriction on the molecular weight of the resulting polymer.

The emulsion polymerization is conducted in a reactor freed of oxygen. Monomers, a nonionic surface active agent, an ionic surface active agent, a molecular weight regulator, a polymerization initiator, etc. may be added at one time before the start of reaction, or in any desired portions after the start of reaction. In the course of reaction, conditions such as temperature, stirring and the like may be changed as desired.

Any of continuous and batchwise polymerizations can be adopted.

The polymer latex thus obtained is subjected to monomer recovery by a conventional monomer recovery procedure such as by distillation under reduced pressure, steam distillation or the like, after which an electrolyte is added to the resulting polymer latex and the resulting mixture is then heated, upon which a polymer precipitates and can be isolated. The heating may be conducted batchwise in a vessel or continuously.

The polymer separated after the coagulation is optionally water-washed, and then dried to obtain a product polymer.

The polymer obtained according to the emulsion polymerization method of this invention, as compared with polymers obtained from ordinary emulsion polymerizations, has an extremely low content of metal ions such as alkali metals, alkaline earth metals and the like.

The thermosetting resin used in this invention is preferably an epoxy resin, a phenol resin, a urea resin, a melamine resin or the like. Of these, the epoxy resin and the phenol resin are more preferable.

The epoxy resin usable in this invention includes bisphenol type epoxy resins and special epoxy resins such as novolak type epoxy resins, polyphenol type epoxy resins, alicyclic type epoxy resins and rubber-modified epoxy resins.

The phenol resin used in this invention includes not only common resol type and novolak type phenol resins, but also cresol resins, xylenol resins and phenol resins modified by cresol, xylene, lignin, petroleum-based aromatic hydrocarbon resin, or the like.

In this invention, the ratio of the functional, rubbery copolymer to the thermosetting resin is 1 to 100 parts by weight, preferably 1 to 50 parts by weight, more preferably 2 to 30 parts by weight, of the former per 100 parts by weight of the latter. When the weight ratio is less than 1, no effect on impact resistance and molding shrinkage can be obtained. When the weight ratio exceeds 100, the volume resistivity which is characteristic of the thermosetting resins is impaired and the strength is reduced.

In curing the thermosetting resin composition of this invention, any of the curing agent used for conventional thermosetting resins can be employed. To the thermosetting resin composition of this invention can be further added, if necessary, flllers such as silica, clay, gipsum, calcium carbonate, quartz powder, kaolin, mica, sodium silicate, talc, calcium silicate, titanium compound, antimony compound and the like as well as additives such as a pigment, an antioxidant, a stabilizer, a plasticizer, a softener, a lubricant and the like.

The method of blending the thermosetting resin with the functional, rubbery copolymer is not critical, and a conventional roll, closed type mixer, extruder or the like may be used depending upon the rubber/resin ratio.

The thermosetting resin composition of this invention can effectively be used as not only a coating material for electronic parts but also an adhesive, an electrodeposition coating material, a lining material, a sealing material and other various molding materials.

DESCRIPTION OF PREFERRED EMBODIMENTS

This invention will be explained specifically below by way of Examples; however, the invention is in no way restricted to these Examples.

EXAMPLES 1 TO 9 AND COMPARATIVE EXAMPLES 1 TO 5

Using the following polymerization recipe, emulsion polymerization was carried out at 20° C. in an autoclave having an internal volume of 20 liters:

| | |
|---|---|
| Butadiene | 55 parts by weight |
| Acrylonitrile | 35 parts by weight |
| Methacrylic acid | 10 parts by weight |
| Water | 220 parts by weight |
| Polyoxyethylene nonylphenyl ether[*1] | 5 parts by weight |
| Tertiary dodecyl mercaptan | 0.2 parts by weight |
| Ammonium persulfate | 0.25 parts by weight |
| Cyanoethylated diethanolamine | 0.15 parts by weight |

([*1]Emulgen 920 manufactured by Kao Corp. Cloud point: 82° C.)

When the polymerization conversion reached 90%, 0.2 part by weight, per 100 parts by weight of the monomers, of hydroxylamine sulfate was added to terminate the polymerization. Subsequently, the reaction mixture was heated and subjected to steam distillation at about 70° C. under reduced pressure to recover the remaining monomers. To the resulting polymer latex was added 2 parts by weight of an alkylated phenol as an antioxidant. The resulting mixture was then placed in a pressure tube and heated to 110° C. to coagulate the latex. The resulting crumbs were taken out, waterwashed and thereafter dried at 50° C. under reduced pressure to obtain an evaluation sample of a rubbery copolymer (Sample 1). Other samples shown in Table 1 were also obtained using similar recipes (Samples 2 to 12).

Blending of these samples with an epoxy resin was conducted in the following manner:

| | |
|---|---|
| Epoxy resin* | 100 parts by weight |
| Rubbery copolymer | 20 parts by weight |
| Silica powder | 100 parts by weight |
| Diethylene triamine | 15 parts by weight |

(*Epikote 152 manufactured by Shell Chemical)

The epoxy resin and the rubbery copolymer were kneaded by means of a 4-inch electrically heated roll at 80° C. When the mixture became uniform, the silica powder was added and kneading was continued. Finally, diethyltetramine was added.

The epoxy resin composition obtained was powdered and subjected to press molding at 160° C. for 30 min to obtain a molded plate.

Test specimens for bending test and impact test in Table 2 were prepared by cutting the molded plate (4 mm in thickness) using a milling machine.

Metal-corrosiveness was measured in accordance with the following method:

An epoxy resin composition containing a given amount of a rubbery copolymer was cured and molded into a plate having a size of 10 mm×10 mm.

Separately, a copper plate of 2 mm in thickness (JIS H 3100) was cut to a size of 30 mm×30 mm. The thus obtained copper plate was thoroughly polished with a 100 mesh polishing paper and then degreased.

The polished copper plate was placed on the above epoxy resin composition plate of 10 mm×10 mm, and the resulting assembly was placed in a 300-ml sample bottle. The sample bottle was placed in a gear oven at 80° C. and allowed to stand for 24 hr. The copper plate was taken out and its degree of corrosion was checked visually.

Bending strength test, Izod impact test, volume resistivity, and shrinkage were measured in accordance with JIS K 6911.

The results of these tests are shown in Table 2.

EXAMPLE 10

The same procedure as in Example 1 was repeated with the same emulsion polymerization recipe as in Example 1, except that 1 part by weight of sodium dodecylbenzenesulfonate was added, to effect emulsion polymerization, and when the polymerization conversion reached 90%, the polymerization was terminated, after which the remaining monomers were removed and an antioxidant was added.

Subsequently, 10 parts by weight of ammonium sulfate was added in the form of a 20% by weight aqueous solution. The resulting mixture was heated to 90° C. to coagulate the latex. The crumbs formed were taken out, water-washed at 50° C. and dried under reduced pressure to obtain an evaluation sample (Sample 13).

The results of evaluation are shown in Table 2.

As seen from Table 2, the epoxy resin compositions according to this invention (Examples 1 to 10) have a high strength, a good impact resistance, a small molding shrinkage and no metal-corrosiveness. These effects are particularly remarkable when a rubbery copolymer having a carboxyl group is used.

Therefore, the epoxy resin compositions according to this invention are particularly effective as a molding, dipping, casting, embedding, encapsulating or sealing material for electronic parts.

EXAMPLE 11

Using the functional, rubbery copolymer obtained in Example 1 (Sample 1), a phenol resin composition was prepared with the following compounding recipe:

| | |
|---|---|
| Resol type phenol resin (obtained by subjecting 1 part by weight of phenol and 1.8 parts by weight of formaldehyde to condensation reaction at 100° C. for 2 hr) | 100 parts by weight |
| Sample 1 (added in the form of a 50% by weight MEK solution) | 30 parts by weight |

The resin and the rubbery copolymer solution were kneaded at 60° C. for 5 min by means of a closed type kneader to obtain a resin composition. About 1 g of this composition was placed on a thoroughly polished copper plate of 30 mm×30 mm×2.0 mm (thickness). The resulting assembly was heated at 180° C. for 30 min in an oven to cure the composition.

Then, the assembly was allowed to stand for 24 hr in a constant temperature and constant humidity chamber controlled to 80° C. and 50% RH. Thereafter, the copper plate was taken out and its degree of corrosion was checked visually. No corrosion was found.

EXAMPLE 12

Using the functional, rubbery copolymer obtained in Example 10 (Sample 13), a phenol resin composition was prepared with the same compounding recipe as in Example 11. The composition was evaluated in the same manner as in Example 11.

No corrosion was found.

EXAMPLES 13 TO 26 AND COMPARATIVE EXAMPLES 6 TO 17

Samples 14, 15, 16 and 17 were prepared with the recipes shown in Table 3 in the same manner as in Example 1, and Samples 18 and 19 were prepared with the recipes shown in Table 3 in the same manner as in Example 10.

Sample 20 is for comparison and contains a polymer obtained by using a conventional anionic surface active agent and a metal salt as a coagulant.

Each sample was evaluated in accordance with the manner stated in Example 11. The results are shown in Table 4.

As is obvious from Table 4, the compositions of this invention, as compared with compositions comprising a polymer obtained by a conventional emulsion polymerization, are extremely low in metal-corrosiveness and, in the present compositions, curing of phenol resin can proceed satisfactorily.

Next, it will be shown below that the resin composition of this invention can be used as an excellent molding material.

100 parts by weight of a novolak resin, 10 parts by weight of Sample 1 and 10 parts by weight of hexamethylenetetramine (curing agent) were kneaded at 140° C. for 4 min on a roll.

The kneaded material was powdered and press-molded to prepare a molded plate of 4 mm in thickness.

Using this plate, test specimens were cut by means of a milling machine. The specimens were subjected to bending strength test and Izod impact test in accordance with JIS K 6911.

The other rubbery copolymers shown in Table 3 were subjected to the same procedure as above. The test results are shown in Table 5.

Metal-corrosiveness in Table 5 was determined in accordance with the following method: A cured plate (4 mm in thickness) of a phenol resin composition containing a given amount of a rubbery copolymer was prepared, and cut into plates having a size of 10 mm×10 mm. Separately, a copper plate of 2 mm in thickness (JIS H 3100) was cut into plates having a size of 30 mm×30 mm and the thus obtained plate was thoroughly polished with a 100 mesh polishing paper and then degreased.

The polished copper plate was placed on the phenol resin composition plate of 10 mm×10 mm, and the resulting assembly was placed in a 300-ml sample bottle. The bottle was placed in a grear oven at 80° C. and allowed to stand for 24 hr. Then, the copper plate was taken out and its degree of corrosion was checked visually.

Comparative Example 17 did not use any rubbery copolymer.

As is obvious from Table 5, the phenol resin compositions according to this invention are materials having an excellent impact resistance and an excellent mechanical strength.

TABLE 1

| | Sample 1 | Sample 2 | Sample 3 | Sample 4 | Sample 5 | Sample 6 | Sample 7 | Sample 8 | Sample 9 | Sample 10 | Sample 11 | Sample 12 |
|---|---|---|---|---|---|---|---|---|---|---|---|---|
| Monomer | | | | | | | | | | | | |
| Butadiene | 55 | 55 | 55 | 55 | 65 | 62 | | | | 30 | 25 | 35 |
| Acrylonitrile | 35 | 35 | 35 | 35 | 35 | 35 | 3 | 3 | 3 | 25 | 20 | 25 |
| Butyl acrylate | | | | | | | 31 | 29 | 32 | 40 | 35 | 40 |
| Ethyl acrylate | | | | | | | 22 | 21 | 23 | | | |
| Methoxyethyl acrylate | | | | | | | 41 | 37 | 42 | | | |
| Methacrylic acid | 10 | | | | | 3 | | 10 | | 5 | | |
| Glycidyl methacrylate | | 10 | | | | | 3 | | | | | |
| 2-Hydroxypropyl methacrylate | | | 10 | | | | | | | | 20 | |
| Diethylaminoethyl methacrylate | | | | 10 | | | | | | | | |
| Tertiarydodecyl mercaptan | 0.71 | 0.65 | 0.70 | 0.70 | 0.50 | 0.60 | 0.10 | 0.10 | 0.03 | 0.20 | 0.30 | 0.22 |
| Amount of unit bound | | | | | | | | | | | | |
| Butadiene | 57 | 57 | 57 | 56 | 64 | 60 | | | | 32 | 27 | 36 |
| Acrylonitrile | 34 | 35 | 35 | 35 | 36 | 37 | 3 | 3 | 3 | 25 | 21 | 25 |
| Butyl acrylate | | | | | | | 32 | 31 | 34 | 38 | 35 | 39 |
| Ethyl acrylate | | | | | | | 24 | 22 | 25 | | | |
| Methoxyethyl acrylate | | | | | | | 39 | 35 | 38 | | | |
| Methacrylic acid | 9 | | | | | 3 | | 9 | | 5 | | |

TABLE 1-continued

|  | Sample 1 | Sample 2 | Sample 3 | Sample 4 | Sample 5 | Sample 6 | Sample 7 | Sample 8 | Sample 9 | Sample 10 | Sample 11 | Sample 12 |
|---|---|---|---|---|---|---|---|---|---|---|---|---|
| Glycidyl methacrylate |  | 8 |  |  |  |  | 2 |  |  |  |  |  |
| 2-Hydroxypropyl methacrylate |  |  | 8 |  |  |  |  |  |  |  |  |  |
| Diethylaminoethyl methacrylate |  |  |  | 9 |  |  |  |  |  |  | 17 |  |
| Mooney viscosity $ML_{1+4}$ (100° C.) | 61 | 70 | 52 | 60 | 73 | 56 | 42 | 58 | 49 | 56 | 71 | 50 |

TABLE 2

|  | Example 1 | Example 2 | Example 3 | Example 4 | Example 5 | Comparative Example 1 | Comparative Example 2 | Example 6 |
|---|---|---|---|---|---|---|---|---|
| Rubbery copolymer | Sample 1 | Sample 2 | Sample 3 | Sample 4 | Sample 6 | Sample 5 | JSR N230S*[1] | Sample 7 |
| Bending strength (kgf/mm$^2$) | 12.7 | 12.1 | 11.8 | 12.2 | 12.2 | 10.1 | 9.7 | 11.4 |
| Izod impact strength (kgf · cm/cm) | 2.7 | 2.2 | 2.1 | 2.3 | 2.0 | 1.6 | 1.6 | 2.0 |
| Volume resistivity (50% RH, 23° C.) (Ω-cm) | $2.1 \times 10^{15}$ | $1.8 \times 10^{15}$ | $1.5 \times 10^{15}$ | $1.5 \times 10^{15}$ | $1.1 \times 10^{15}$ | $2.1 \times 10^{14}$ | $1.0 \times 10^{14}$ | $1.6 \times 10^{15}$ |
| Shrinkage (mm/mm) | 0.0051 | 0.0055 | 0.0059 | 0.0053 | 0.0053 | 0.0062 | 0.0063 | 0.0053 |
| Metal-corrosiveness | No change | No change | No change | No change | No change | No change | Corroded to red color | No change |

|  | Example 7 | Comparative Example 3 | Example 8 | Example 9 | Comparative Example 4 | Comparative Example 5 | Example 10 |
|---|---|---|---|---|---|---|---|
| Rubbery copolymer | Sample 8 | Sample 9 | Sample 10 | Sample 11 | Sample 12 | JSR N640H*[2] | Sample 13 |
| Bending strength (kgf/mm$^2$) | 11.9 | 8.6 | 11.8 | 12.2 | 9.0 | 8.9 | 12.7 |
| Izod impact strength (kgf · cm/cm) | 2.6 | 1.6 | 2.1 | 2.3 | 1.5 | 1.5 | 2.7 |
| Volume resistivity (50% RH, 23° C.) (Ω-cm) | $2.0 \times 10^{15}$ | $2.2 \times 10^{14}$ | $9.6 \times 10^{14}$ | $1.9 \times 10^{15}$ | $3.1 \times 10^{14}$ | $2.6 \times 10^{14}$ | $2.0 \times 10^{15}$ |
| Shrinkage (mm/mm) | 0.0049 | 0.0065 | 0.0052 | 0.0051 | 0.0066 | 0.0064 | 0.0050 |
| Metal-corrosiveness | No change | No change | No change | No change | No change | Corroded to red color | No change |

*[1]JSR N230S: Amount of bound acrylonitrile: 35% by weight, Mooney viscosity [$ML_{1+4}$ (100° C.)]: 56
*[2]JSR N640H: Butadiene-acrylonitrile-acrylate terpolymer [Amount of bound acrylonitrile: 25% by weight, Mooney viscosity [$ML_{1+4}$ (100° C.)]: 70]

TABLE 3

|  | Sample No. | | | | | | | | | |
|---|---|---|---|---|---|---|---|---|---|---|
|  | 1 | 13 | 18 | 14 | 15 | 16 | 17 | 19 | 20 | 10 |
| Polymerization recipe (parts by weight) | | | | | | | | | | |
| Butadiene | 55 | 55 | 55 | 55 | — | — | 25 | 30 | 55 | 66 |
| Acrylonitrile | 35 | 35 | 35 | 35 | 3 | 3 | 20 | 35 | 35 | 34 |
| Butyl acrylate | — | — | — | — | 31 | 29 | 35 | 40 | — | — |
| Ethyl acrylate | — | — | — | — | 22 | 21 | — | — | — | — |
| Methoxyethyl acrylate | — | — | — | — | 41 | 37 | — | — | — | — |
| Methacrylic acid | 10 | 10 | 10 | — | — | 10 | — | 5 | 10 | — |
| Glycidyl methacrylate | — | — | — | — | 3 | — | — | — | — | — |
| 2-Hydroxypropyl methacrylate | — | — | — | 10 | — | — | — | — | — | — |
| Diethylaminoethyl methacrylate | — | — | — | — | — | — | 20 | — | — | — |
| Tertiary dodecyl mercaptan | 0.71 | 0.71 | 0.71 | 0.70 | 0.10 | 0.10 | 0.20 | 0.20 | 0.71 | 0.90 |
| Enaulgen 920 | 5 | 5 | 4 | 5 | 5 | 5 | 5 | 4 | — | 5 |
| Sodium dodecylbenzene-sulfonate | — | 1 | — | — | — | — | — | 2 | 5 | — |
| Potassium oleate | — | — | 2 | — | — | — | — | — | — | — |
| Ammonium sulfate | — | 10 | 10 | — | — | — | — | 10 | — | — |
| Calcium chloride | — | — | — | — | — | — | — | — | 10 | 10 |
| Coagulation temperature | 110° C. | 90° C. | 90° C. | 110° C. | 110° C. | 110° C. | 110° C. | 90° C. | 60° C. | 60° C. |
| Polymer Amount of bound unit | | | | | | | | | | |
| Butadiene | 57 | 57 | 57 | 56 | — | — | 27 | 32 | 57 | 64 |
| Acrylonitrile | 34 | 34 | 35 | 35 | 3 | 3 | 21 | 25 | 34 | 36 |
| Butyl acrylate | — | — | — | — | 32 | 31 | 35 | 38 | — | — |
| Ethyl acrylate | — | — | — | — | 24 | 22 | — | — | — | — |
| Methoxyethyl acrylate | — | — | — | — | 39 | 35 | — | — | — | — |
| Methacrylic acid | 9 | 9 | 9 | — | — | 9 | — | 5 | 9 | — |
| Glycidyl methacrylate | — | — | — | — | 2 | — | — | — | — | — |
| 2-Hydroxypropyl | — | — | — | 9 | — | — | — | — | — | — |

TABLE 3-continued

|  | Sample No. | | | | | | | | | |
|---|---|---|---|---|---|---|---|---|---|---|
|  | 1 | 13 | 18 | 14 | 15 | 16 | 17 | 19 | 20 | 10 |
| methacrylate |  |  |  |  |  |  |  |  |  |  |
| Diethylaminoethyl methacrylate | — | — | — | — | — | — | 17 | — | — | — |
| Mooney viscosity | 61 | — | — | 60 | 42 | 58 | 71 | 51 | 69 | 58 |

TABLE 4

|  | Example 11 | Example 12 | Example 13 | Example 14 | Example 15 | Example 16 | Example 17 | Example 18 |
|---|---|---|---|---|---|---|---|---|
| Kind of rubbery polymer | Sample 1 | Sample 13 | Sample 18 | Sample 14 | Sample 15 | Sample 16 | Sample 17 | Sample 19 |
| Amount of rubbery polymer *1 | 30 | 30 | 30 | 30 | 30 | 30 | 30 | 30 |
| Metal-corrosiveness | No change | No change | No change | No change | No change | No change | No change | No change |
| State after setting at 180° C. for 30 min | Completely cured | Completely cured | Completely cured | Completely cured | Completely cured | Completely cured | Completely cured | Completely cured |

|  | Comparative Example 6 | Comparative Example 7 | Comparative Example 8 | Example 19 | Comparative Example 9 | Example 20 | Comparative Example 10 |
|---|---|---|---|---|---|---|---|
| Kind of rubbery polymer | Sample 20 | JSR N230S*2 | JSR N640H*3 | Sample 1 | Sample 20 | Sample 1 | Sample 20 |
| Amount of rubbery polymer *1 | 30 | 30 | 30 | 10 | 10 | 50 | 50 |
| Metal-corrosiveness | Corroded to reddish brown color | Corroded to reddish brown color | Corroded to reddish brown color | No change | Changed to brown color | No change | Corroded to reddish brown color |
| State after setting at 180° C. for 30 min | Insufficiently cured (Tacky surface) | Insufficiently cured | Insufficiently cured | Completely cured | Insufficiently cured (Slightly tacky) | Completely cured | Insufficiently cured |

*1 Amount per 100 parts by weight of resol type resin
*2 JSR 230S: Amount of bound acrylonitrile: 35% by weight, Mooney viscosity [ML$_{1+4}$ (100° C.)]: 56
*3 JSR N640H: Butadiene-acrylonitrile-acrylate terpolymer [Amount of bound acrylonitrile: 25% by weight, Mooney viscosity [ML$_{1+4}$ (100° C.)]: 70]

TABLE 5

|  | Example 21 | Example 22 | Example 23 | Example 24 | Example 25 | Example 26 | Comparative Example 11 |
|---|---|---|---|---|---|---|---|
| Kind of rubbery copolymer | Sample 1 | Sample 1 | Sample 13 | Sample 14 | Sample 16 | Sample 17 | Sample 20 |
| Amount of rubbery polymer*1 (parts by weight) | 10 | 30 | 10 | 10 | 20 | 10 | 10 |
| Bending strength (kgf/mm$^2$) | 4.1 | 5.2 | 3.9 | 3.5 | 3.6 | 3.1 | 4.0 |
| Izod impact strength (kgf · cm/cm) | 2.5 | 4.8 | 2.5 | 2.0 | 2.7 | 2.4 | 2.5 |
| Metal-corrosiveness | No change | No change | No change | No change | No change | No change | Corroded to red color |

|  | Comparative Example 12 | Comparative Example 13 | Comparative Example 14 | Comparative Example 15 | Comparative Example 16 | Comparative Example 17 |
|---|---|---|---|---|---|---|
| Kind of rubbery copolymer | Sample 21 | Sample 21 | JSR N230S | JSR N640H | JSR AR101*2 | — |
| Amount of rubbery polymer*1 (parts by weight) | 10 | 30 | 10 | 10 | 20 | — |
| Bending strength (kgf/mm$^2$) | 2.6 | 3.9 | 2.9 | 2.6 | 2.4 | 2.2 |
| Izod impact strength (kgf · cm/cm) | 1.8 | 3.0 | 2.1 | 1.4 | 1.1 | 0.9 |
| Metal-corrosiveness | No change | No change | Corroded to red color | Corroded to red color | Corroded to red color | No change |

*1 Amount per 100 parts by weight of novolak resin
*2 JSR AR101: Acrylic rubber having a Mooney viscosity [ML$_{1+4}$ (100° C.)] of 50.

What is claimed is:

1. A resin composition comprising 100 parts by weight of a thermosetting resin selected from the group consisting of an epoxy resin, a phenol resin, a urea resin and a melamine resin and 1 to 100 parts by weight of a functional, rubbery copolymer of one of the following types:

(I) a copolymer comprising monomer units of (i) from 1 to 20% by weight of least one monomer containing a substituent selected from the group consisting of epoxy, hydroxyl, carboxyl and amino groups, (ii) from 15 to 20% by weight of acrylonitrile and (iii) from 40 to 80% by weight of butadiene, isoprene or a mixture thereof;

(II) a copolymer comprising monomer units of (i) from 1 to 20% by weight of at least one monomer containing a substituent selected from the group consisting of epoxy, hydroxyl, carboxyl and amino groups, (ii) from 40 to 99% by weight of an alkyl(meth)acrylate, an alkoxyalkyl(meth)acrylate or a mixture thereof and (iii) from 0 to 30% by weight of other monomers copolymerizable with the monomers (i) and (ii);

(III) a copolymer comprising monomer units of (i) from 1 to 20% by weight of at least one monomer containing a substituent selected from the group consisting of epoxy, hydroxyl, carboxyl and amino groups, (ii) from 15 to 50% by weight of acrylonitrile, (iii) from 20 to 60% by weight of butadiene, isoprene or a mixture thereof and (iv) from 5 to 65% by weight of an alkyl(meth)acrylate, an alkoxyalkyl(meth)acrylate or a mixture thereof;

said copolymer being produced by one of the following methods:

(a) emulsion polymerizing the monomers which constitute said copolymer in the presence of an emulsifier consisting of 1 to 15 parts by weight of a nonionic surface active agent and 0 to 10 parts by weight of an ionic surface active agent per 100 parts by weight of the monomers, the weight ratio of the ionic surface active agent to the nonionic surface active agent being 0–2.0:1, recovering unreacted monomers, adding a metal-free electrolyte to the resulting polymer emulsion, heating the resulting mixture to precipitate a copolymer and then drying the copolymer;

(b) emulsion polymerizing the monomers which constitute said copolymer in the presence of an ionic surface active agent as an emulsifier, recovering unreacted monomers, adding to the resulting polymer emulsion a metal-free electrolyte and a nonionic surface active agent, heating the resulting mixture to precipitate a copolymer, and then drying the polymer;

(c) emulsion polymerizing the monomers which constitute said copolymer in the presence of a nonionic surface active agent as an emulsifier at a temperature lower than the cloud point of the nonionic surface active agent and then heating the resulting polymer latex to a temperature not lower than said cloud point to coagulate the latex without the addition of a coagulent.

2. A resin composition according to claim 1, wherein the thermosetting resin is a phenol resin.

3. A resin composition according to claim 2, wherein the functional, rubbery copolymer is produced by subjecting the constituent monomers to emulsion polymerization using a nonionic surface active agent as an emulsifier at a temperature lower than the cloud point of the nonionic surface active agent and then heating the resulting polymer latex to a temperature not lower than said cloud point to coagulate a polymer without using any coagulant.

4. The resin composition of claim 1, wherein, in said method (a) for preparing said copolymer, said process further comprising washing the precipitated copolymer obtained with water.

5. The resin composition of claim 1, wherein, in said method (b) for preparing said copolymer, said process further comprising washing the precipitated copolymer obtained with water.

6. The resin composition of claim 1, wherein said thermosetting resin is an epoxy resin.

7. The resin composition of claim 1, wherein said carboxyl group containing monomer is acrylic acid, methacrylic acid, maleic acid or fumaric acid.

8. The resin composition of claim 1, wherein said epoxy group containing monomer is glycidyl(meth)acrylate, allyl glycidyl ether or vinyl glycidyl ether.

9. The resin composition of claim 1, wherein said hydroxyl group containing monomer is 1-hydroxypropyl(meth)acrylate, 2-hydroxypropyl(meth)acrylate, or hydroxyethyl(meth)acrylate.

10. The resin composition of claim 1, wherein said amino group containing monomer is dimethylaminoethyl(meth)acrylate, diethylaminoethyl(meth)acrylate, or dibutylaminoethyl(meth)acrylate.

11. The resin composition of claim 1, wherein said alkyl(meth)acrylate is ethylacrylate, ethylmethacrylate, propylacrylate, butylacrylate, butylmethacrylate, hexylacrylate, 2-ethylhexylacrylate or octylacrylate.

12. The resin composition of claim 1, wherein said alkoxyalkyl(meth)acrylate is ethoxyethylacrylate, methoxyethylacrylate, propoxyethylacrylate, methoxyethylmethacrylate, ethoxyethylmethacrylate, butoxyethylacrylate or butoxyethylmethacrylate.

13. The resin composition of claim 1, wherein said nonionic surface active agent is polyoxyethylene alkyl ether, polyoxyethylene alkylaryl ether, polyoxyethylene fatty acid ester, polyoxyethylene sorbitan fatty acid ester, polyoxyethylene-oxypropylene block polymer, alkylsulfinyl alcohol or fatty acid monoglyceride.

14. The resin composition of claim 1, wherein said nonionic surface active agent is present in the emulsion polymerization medium in an amount of from 1 to 15 parts by weight per 100 parts by weight of monomer.

15. The resin composition of claim 1, wherein said ionic surface active agent is an anionic surface active agent, a cationic surface active agent or an amphoteric surface active agent.

16. The resin composition of claim 1, wherein, in the emulsified polymerization medium, said ionic surface active agent is present in an amount of from 0 to 10 parts by weight per 100 parts by weight of the monomer ingredients.

17. The resin composition of claim 1, wherein from 1 to 50 parts by weight of said rubbery copolymer is combined with 100 parts by weight of said thermosetting resin.

18. A resin composition comprising 100 parts by weight of a thermosetting epoxy resin and 1 to 100 parts by weight of a functional, rubbery copolymer of one of the following types:

(I) a copolymer comprising monomer units of (i) from 1 to 20% by weight of at least one monomer containing a substituent selected from the group consisting of epoxy, hydroxyl, carboxyl and amino groups, (ii) 15 to 50% by weight of acrylonitrile and (iii) from 40 to 80% by weight of butadiene, isoprene or a mixture thereof;

(II) a copolymer comprising monomer units of (i) from 1 to 20% by weight of at least one monomer containing a substituent selected from the group consisting of epoxy, hydroxyl, carboxyl and amino groups, (ii) from 40 to 99% by weight of an alkyl(meth)acrylate, an alkoxyalkyl(meth)acrylate or a mixture thereof and (iii) from 0 to 30% by weight of other monomers copolymerizable with the monomers (I) and (ii);

(III) a copolymer comprising monomer units of (i) from 1 to 20% by weight of at least one monomer containing a substituent selected from the group consisting of epoxy, hydroxyl, carboxyl and amino groups, (ii) from 15 to 50% by weight of acrylonitrile, (iii) from 20 to 60% by weight of butadiene, isoprene or a mixture thereof and (iv) 5 to 65% by weight of an alkyl(meth)acrylate, an alkoxyalkyl(meth)acrylate or a mixture thereof;

said copolymer being produced by one of the following methods:

(a) emulsion polymerizing the monomers which constitute said copolymer in the presence of an emulsifier consisting of 1 to 15 parts by weight of a nonionic surface active agent and 0 to 10 parts by weight of an ionic surface active agent per 100 parts by weight of the monomers, the weight ratio of the ionic surface active agent to the nonionic surface active agent being 0–2.0:1, recovering unreacted monomers, adding a metal-free electrolyte to the resulting polymer emulsion, heating the resulting mixture to precipitate a copolymer, and then drying the copolymer;

(b) emulsion polymerizing the monomers which constitute said copolymer in the presence of an ionic surface active agent as an emulsifier, recovering unreacted monomers, adding to the resulting polymer emulsion a metal-free electrolyte and a nonionic surface active agent, heating the resulting mixture to precipitate a copolymer and then drying the copolymer.

19. The resin composition of claim 18, wherein, in said method (a) for preparing said copolymer, said process further comprising washing the precipitated copolymer obtained with water.

20. The resin composition of claim 19 wherein, in said method (b) for preparing said copolymer, said process further comprising washing the precipitated copolymer obtained with water.

* * * * *